July 3, 1928.
C. M. HOLLEY
1,676,031
EXPANSION VALVE
Original Filed Sept. 18, 1922
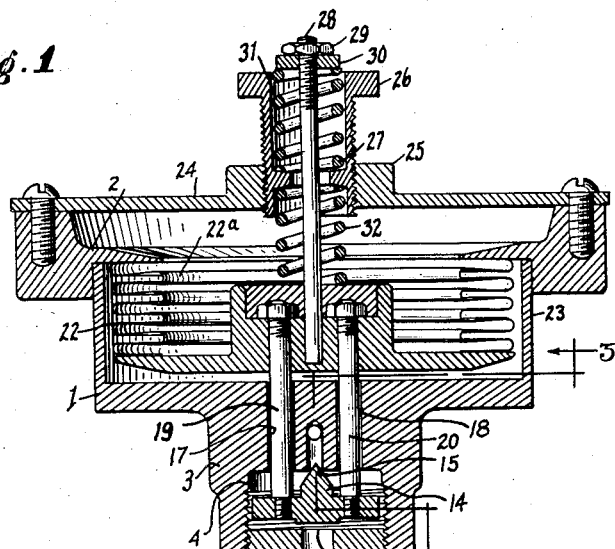
Fig. 1
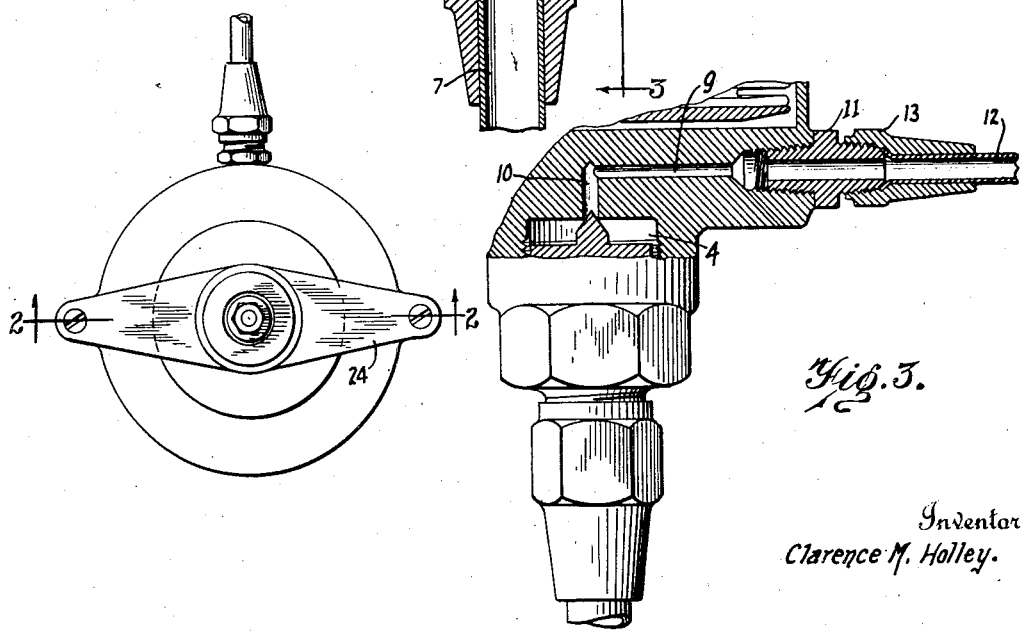
Fig. 2
Fig. 3
Inventor
Clarence M. Holley.
By Charles E. Wiwar
Attorney Patented July 3, 1928.

1,676,031

UNITED STATES PATENT OFFICE.

CLARENCE M. HOLLEY, OF HIGHLAND PARK, MICHIGAN, ASSIGNOR, BY MESNE ASSIGNMENTS, TO THE HOOVER COMPANY, OF NORTH CANTON, OHIO, A CORPORATION OF OHIO.

EXPANSION VALVE.

Application filed September 18, 1922, Serial No. 588,789. Renewed November 30, 1925.

This invention relates to automatic expansion valves for artificial refrigerating systems, and its object is to provide a valve between the high and low pressure sides of the circulating system that is automatic in operation and of simple construction which, under influence of the pump, is adapted to produce a two-stage expansion of the refrigerant passing therethrough. A feature of the invention is in the construction of the device whereby a very small volume only in comparison to the volume of expansion or low pressure side of the circulating system is expanded at any interval, the valve operating to discharge a small volume of refrigerant under pressure to the low pressure side of the valve which is located in a chamber provided in the valve body. The valve is connected with a bellows like member and the arrangement is such that the refrigerant under pressure tends to compress the bellows member and close the inlet on the high pressure side and open the outlet on the low pressure side of the valve. A feature of this invention is in the provision of adjusting means whereby the pressure required to close the valve may be varied and thus adapting the valve for general use in artificial refrigerating systems in that adjustment may be made for use in systems requiring a higher or lower pressure on the compression side of the system to operate the valve. A further feature is in the provision of means whereby adjustment may be made to vary the extent of reduction of pressure required to open the valve. Thus, the system, by adjustment of this valve, may be made to operate at various pressures to produce the desired temperature of the circulating refrigerant. Heretofore, the ordinary expansion valve used between the high and low pressure sides of a circulating system, when the valve opened, it remained open until the vacuum on the entire expansion side of the system is relieved to an extent to permit the closing of the valve. Thus, the expansion side of such previous systems is continuously varying between certain low and certain high degree of pressure. By my construction and arrangement of the valve, the expansion side of the system, according to the adjustment of the valve, stands practically at certain low pressure as the refrigerant fluid by means of my improved valve is only fed to the expansion side of the system when the pressure tends to fall below normal. These and other objects and novel features of the invention are hereinafter more fully described and claimed and the preferred form of construction of an expansion valve embodying my invention is shown in the accompanying drawings in which—

Fig. 1 is a longitudinal section of my improved expansion valve.

Fig. 2 is a plan view thereof on a reduced scale.

Fig. 3 is a section taken on line 3—3 of Fig. 1.

The valve consists of a body 1 of hollow cylindrical form and has at the upper open end an inwardly extending flange 2 which may be brazed to the body or otherwise secured in a manner to prevent leakage between the flange and the body. The body at the lower end is provided with a stem like portion 3 recessed as indicated at 4 and threaded to receive a member 5 which extends only partially into the recess providing the chamber 4 between the end of the recess and the inner end of the member 5. The member 5 has a longitudinal aperture 6, and a conduit 7 leading to the expansion coils is secured to the member 5 by a nut or coupling 8 in the usual manner of such connections. As shown more clearly in Fig. 3 the body has a channel 9 formed therein radially of the body and opening into a vertical channel 10 which opens into the chamber 4. A coupling member 11 is provided to which a pressure line 12 is connected by means of a nut 13. In this chamber 4 is a valve member 14 having a coned upper end 15 and a flat lower end 16. This valve plays between the outlet end of the conduit 10 and the inlet end of the exhaust conduit 6. Additionally there are two vertical apertures 17 and 18 in the body leading from the chamber 4 into the bottom of the cylindrical body member. Extending through these apertures 17 and 18 are rods 19 and 20 less in diameter than the diameter of the apertures thus permitting passage of gas or fluid through the apertures about the rods which are attached directly to the valve member 14. In the hollow cylindrical portion of the body is a circular plate 21 having a cupped hub at the center to which the rods 19 and 20 are connected. After the rods are attached the cupped end of the hub is filled with solder covering the rod ends and nuts thereon. A corrugated bellows member of the well known form preferably of copper is attached to the periphery of the member 21 and to the flange 2 and a chamber 22 is thus provided between the bellows member and wall 23 of the cylindrical portion of the body which is thus sealed to atmosphere and the refrigerant fluid may pass into the chamber 22 through the apertures 17 and 18 from the chamber 4. I further provide a bar 24 extending diametrically across the device and secured by screws to bosses provided on the flange 2. This bar has a central hub 25 threaded to receive a hollow nut 26. The nut in the interior is provided with the flange or shoulder 27 and a rod 28 is connected centrally of the member 21 and extends upward through the hollow nut 26. This rod 28 is threaded at the upper end and is provided with a nut 29 and lock nut 30. A coiled spring 31 is provided in the hollow nut 26 seating on the upper side of the flange 27 at one end and against the nut 30 at the other and a coiled spring 32 is provided about the rod seating against the lower side of the flange 27 and against the hub of the member 21 at the center. The lower spring is a compression spring tending to expand or elongate the bellows member 22ª while the coiled spring 31 tends to compress or contract the bellows member. It is to be noted that, by turning the nut 26 down, the compression of the spring 32 is increased while that of the spring 31 will be decreased and vice versa. Normally, the tension of both springs will be alike under the construction shown when not in operation, but any tendency to contract the bellows member is resisted by the spring 32 only and any force tending to expand the bellows member is resisted by the tension of the spring 31. As is well known, with the usual artificial refrigerating system a compressor (not here shown) is used to withdraw the refrigerant from the expansion coils which are connected with the conduit 7 and discharge the same into the compression coils which are open to the conduit 12. With this device the conduit 10 is closed by the valve 14 until certain reduction of pressure is occasioned in the expansion line and this reduction in pressure is occasioned in the chamber 4, the apertures 17 and 18 and the chamber 22. This is determined by atmospheric pressure and the tension of the spring 31 which requires to be compressed in elongating or expanding the bellows member. This movement of the bellows member and plate 21 opens the line 10 to the chamber 4 and closes the chamber 4 to the outlet line 16. This permits the fluid under pressure to flow from the line 12 through the lines 9 and 10 into the chamber 4 and the chamber 22, the pressure of which tends to contract the bellows member raising the valve to close the inlet line 10. Movement of the valve to close the inlet 10 opens the expansion or low pressure line 16 and the fluid then in the chambers 22 and 4 may flow into the line 16. This is very small in volume in comparison to the volume of the expansion side of the system and the reduction in pressure is again almost immediately sufficiently great to expand the bellows member and open the compression line. Thus, the valve is moved very rapidly between the line 10 and the line 16 opening and closing the same alternately.

By means of the adjusting means described the device is adapted for use generally with refrigerator boxes as each valve may be adjusted to operate at any desired range of pressures. Without the adjusting device the amount of reduction in pressure required in the expansion or low pressure line 7 to open the pressure line would be determined by a natural resistance of the bellows member to expand in conjunction with atmospheric pressure to which the interior of the bellows member is exposed and the system would therefore operate at certain reduced pressure in the expansion line. In different artificial refrigerating systems especially in small household plants, the compressors do not all operate alike due to various differences in structure some requiring a higher pressure or greater expansion than others to produce the same degree of temperature in the storage compartment but by my arrangement herein described including provision of the adjusting device, compensation may be made for differences in the refrigerating apparatus of different installations and all may be made to operate to produce approximately the same degree of temperature of the fluid in the expansion line, and a particular object of this invention is to provide an expansion valve capable of an adjustment whereby the difference in pressure between the high and the low pressure sides may be varied to produce the desired effect.

Having thus fully described my invention, what I claim and desire to secure by Letters Patent of the United States is—

1. An automatic expansion valve for use between high and low pressure lines of a fluid circulating system comprising a body member having a chamber, sealed to atmosphere, a bellows like member subject to expansion or contraction by variation in pressure in the chamber, both the high and low pressure lines opening to said chamber, a valve attached to the bellows member and movable thereby between the said openings of the lines to open and close the same in alternate relation, a spring adjustable to resist contraction of the bellows member, and another spring adjustable to resist expansion of the bellows member.

2. An automatic expansion valve for use between high and low pressure lines, of a fluid circulating system comprising a body having a chamber one side of which is provided with a bellows like member capable of contraction and expansion by variation in pressure in the chamber, a second chamber opening to said first named chamber and into which the high and low pressure lines both open, said openings being in alignment, a valve connected with the bellows member and movable between the openings to open one and close the other in alternate relation, adjustable means for varying the pressure required to contract and other adjustable means for varying the pressure required to expand the bellows member.

3. The combination with the high and low pressure lines of a valve device between the high and low pressure lines consisting of a body member having a chamber, one wall of which is flexible, a second chamber open to the first named chamber and into which both said high and low pressure lines open, a valve connected with the flexible member and movable thereby between the said openings to alternately open and close the same, means determining the pressure at which the valve may be moved to close the opening of the high pressure line to the chamber, and means determining the extent of reduction of pressure required to move the valve to close the opening of the low pressure line and open that of the high pressure line to the chamber.

In testimony whereof, I sign this specification.

CLARENCE M. HOLLEY.